(12) United States Patent
Nakada

(10) Patent No.: US 9,083,217 B2
(45) Date of Patent: Jul. 14, 2015

(54) ROTOR FOR ELECTRIC MOTOR

(75) Inventor: Tohru Nakada, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 176 days.

(21) Appl. No.: 13/812,076

(22) PCT Filed: Jul. 19, 2011

(86) PCT No.: PCT/JP2011/066373
§ 371 (c)(1),
(2), (4) Date: Jan. 24, 2013

(87) PCT Pub. No.: WO2012/014728
PCT Pub. Date: Feb. 2, 2012

(65) Prior Publication Data
US 2013/0154425 A1 Jun. 20, 2013

(30) Foreign Application Priority Data

Jul. 27, 2010 (JP) .................. 2010-168050

(51) Int. Cl.
*H02K 1/27* (2006.01)
*H02K 29/03* (2006.01)

(52) U.S. Cl.
CPC .............. *H02K 1/276* (2013.01); *H02K 1/2766* (2013.01); *H02K 29/03* (2013.01); *H02K 2213/03* (2013.01)

(58) Field of Classification Search
CPC ... H02K 29/03; H02K 2213/03; H02K 1/276; H02K 1/2766
USPC ............................ 310/156.53, 156.56, 156.46
See application file for complete search history.

(56) References Cited

U.S. PATENT DOCUMENTS

| | | | |
|---|---|---|---|
| 7,960,886 B2 * | 6/2011 | Miura et al. ............. | 310/156.57 |
| 8,040,010 B2 * | 10/2011 | Kamiya et al. ........... | 310/156.57 |
| 2006/0017345 A1 | 1/2006 | Uchida et al. | |
| 2009/0230802 A1 * | 9/2009 | Kamiya et al. .......... | 310/156.53 |
| 2010/0181864 A1 * | 7/2010 | Miura et al. ........... | 310/216.094 |

FOREIGN PATENT DOCUMENTS

| | | |
|---|---|---|
| EP | 1 610 444 A1 | 12/2005 |
| JP | 2004-328956 A | 11/2004 |
| JP | 2006-14457 A | 1/2006 |
| JP | 2006-314152 A | 11/2006 |
| JP | 2008-206308 A | 9/2008 |
| WO | WO 2008/150035 A1 | 12/2008 |

* cited by examiner

*Primary Examiner* — Terrance Kenerly
(74) *Attorney, Agent, or Firm* — Foley & Lardner LLP

(57) ABSTRACT

A rotor core is provided in which a plurality of poles each composed of a pair of first permanent magnets arranged in a V-shape open toward an outer peripheral side and a second permanent magnet arranged in parallel to a circumferential direction in an open part of the V-shape are arranged in the circumferential direction while alternately changing the polarities thereof. A groove is formed which has a groove center in a range between an electrical angle position shifted by ¼ cycle of a harmonic component of an induced voltage toward a d-axis and an electrical angle position shifted by ⅛ cycle of the harmonic component toward a q-axis from a base point located between a line connecting a rotor outer peripheral side corner portion of the second permanent magnet and a rotor shaft center and the q-axis out of a plurality of dividing lines connecting a plurality of dividing points set at an electrical angle interval corresponding to one cycle of the harmonic component from the d-axis to the q-axis on the rotor core outer periphery and the rotor shaft center.

6 Claims, 8 Drawing Sheets

ELECTRICAL ANGLE FROM d-AXIS TO GROOVE CENTER[deg]

ROTOR FOR ELECTRIC MOTOR

TECHNICAL FIELD

The present invention relates to a rotor used for an electric motor.

BACKGROUND ART

An interior permanent magnet motor (hereinafter, referred to as an IPM motor as appropriate) in which permanent magnets are embedded in a rotor core is known as an electric motor for driving an electrically driven vehicle such as an electric vehicle or a hybrid vehicle.

The IPM motor has a problem that efficiency in a high rotation region is reduced by iron loss caused by magnetic fluxes of the permanent magnets. Further, it is required to reduce torque ripple to suppress vibration and noise of the electric motor.

Further, in terms of ensuring durability of an inverter component, it is also necessary to prevent a peak value of an induced voltage from exceeding a withstand voltage of an inverter system. The induced voltage is generated by synthesizing a main component contributing to torque and a harmonic component not contributing to torque. If the induced voltage is merely reduced so as not to exceed the withstand voltage of the inverter system, the main component may become smaller and the torque may be reduced. Accordingly, to prevent a torque reduction, the peak value of the induced voltage needs to be reduced by reducing only the harmonic component.

To meet these requirements, two permanent magnets to be embedded in a rotor are used for each pole, and a groove is formed on the outer periphery of the rotor in which these permanent magnets are arranged in a V shape open toward a rotor outer peripheral side so that a groove center lies in an electrical angle range of 40° to 53° in JP2004-328956A.

SUMMARY OF INVENTION

An electric motor is known which includes a rotor in which one permanent magnet is arranged to extend in a circumferential direction in an open part of a V shape in addition to two permanent magnets arranged in the V shape, i.e. three permanent magnets are arranged to form a triangle to generate a higher torque.

The present inventors found that if a groove was provided in an outer peripheral portion as in JP2004-328956A for such a rotor in which the permanent magnets were arranged to form a triangle, iron loss could be reduced, but a harmonic component and torque ripple could not be necessarily improved or rather might be deteriorated.

Accordingly, the present invention aims to realize an iron loss reduction and the like for a rotor in which permanent magnets are arranged to form a triangle.

The detail and other features and advantages of this invention are described in the following description and shown in the accompanying drawings.

DESCRIPTION OF EMBODIMENTS (First Embodiment)

Figure 1:
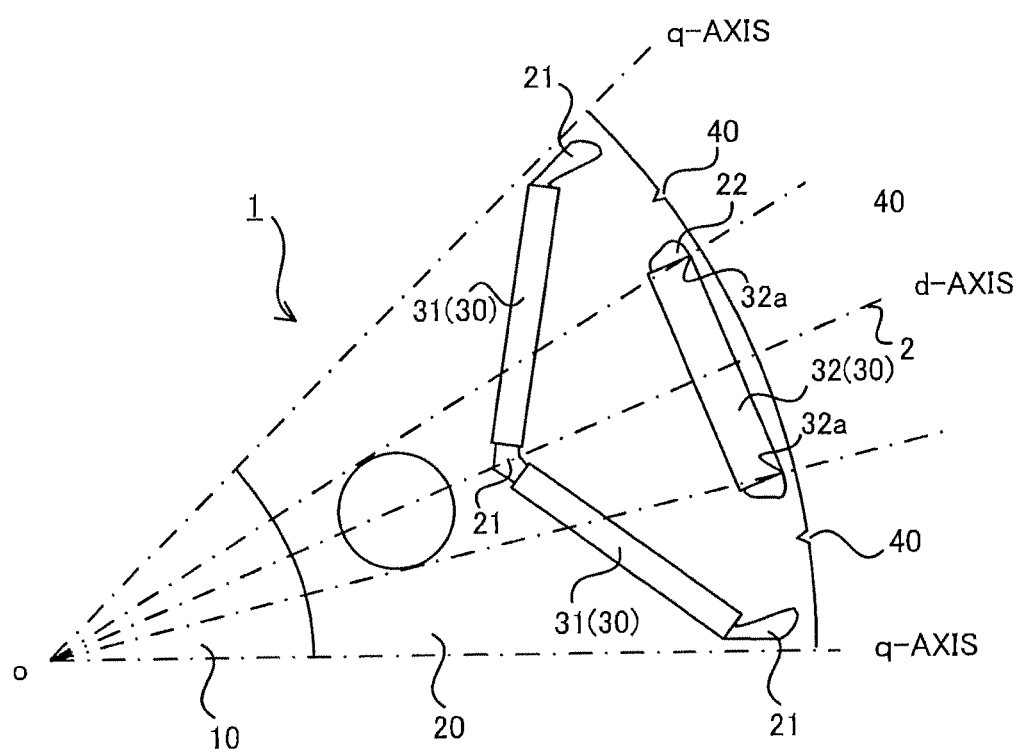
FIG. 1 is a view showing a first embodiment of a rotor for electric motor according to the present invention.

FIG. 1 is a view showing a first embodiment of a rotor for electric motor according to the present invention and shows a cross-section perpendicular to a rotor shaft and indicating ⅛ (mechanical angle of 45°) of the entire circumference. Note that the remaining ⅞ is configured by repeatedly arranging the configuration shown in FIG. 1 in a circumferential direction.

The rotor 1 for electric motor includes a rotor shaft 10, a rotor core 20 and permanent magnet groups 30.

The rotor shaft 10 is a rotary shaft of the rotor 1.

As shown in FIG. 1, the rotor core 20 is provided around the rotor shaft 10. The rotor core 20 is formed by laminating a multitude of electromagnetic steel plates in an axial direction of the rotor shaft 10. The rotor core 20 is formed with a group of cavities 21 formed to be line-symmetrical with respect to an axis of symmetry 2 and a group of cavities 22 parallel to the circumferential direction of the rotor core 20.

The cavity 21 is formed to have a so-called V shape such that a base end part at the rotor shaft 10 side is located on the axis of symmetry 2 and leading end parts approach a q-axis and the rotor outer periphery away from the axis of symmetry 2.

The cavity 22 is formed to be parallel to the circumferential direction of the rotor core 20 in an open part of the V-shaped cavity 21.

The permanent magnet groups 30 are embedded in the cavities 21 and 22 of the rotor core 20. A pair of permanent magnets 31 is embedded in one cavity 21 and one permanent magnet 32 is embedded in one cavity 22.

Since the cavity 21 is line-symmetrical with respect to the axis of symmetry 2, the pair of permanent magnets 31 is also arranged to be line-symmetrical with respect to the axis of symmetry 2, i.e. in a so-called V-shaped arrangement. The pair of permanent magnets 31 arranged in the cavity 21 and the permanent magnet 32 arranged in the cavity 22 form a substantially triangular shape.

A groove 40 having a groove center at a position to be described later in areas defined between a straight line connecting an outer peripheral side corner 32a of the permanent magnet 32 and a rotor center O and the q-axis is formed on an outer peripheral portion of the rotor core 20.

Figure 2:
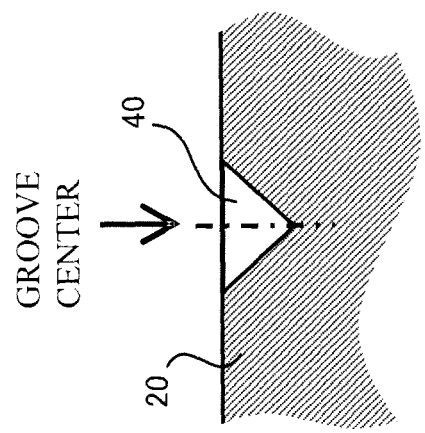
FIG. 2 is a sectional view showing an example of the shape of a groove.

FIG. 2 shows an example of the groove 40. The groove 40 has a triangular cross-sectional shape whose width is gradually narrowed toward the rotor center O and is formed to be line-symmetrical with respect to a straight line connecting a vertex on the rotor center O side and the rotor center O. Thus, the straight line connecting the vertex on the rotor center O side and the rotor center O is the groove center.

Figure 4:
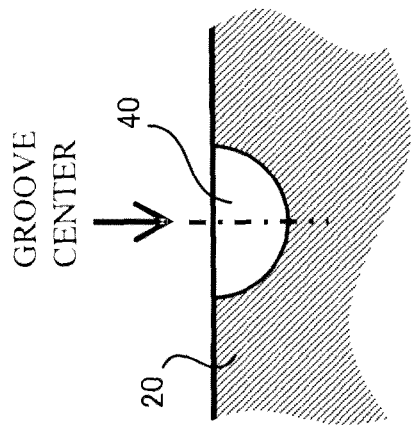
FIG. 4 is a sectional view showing still another example of the shape of the groove.
Figure 3:
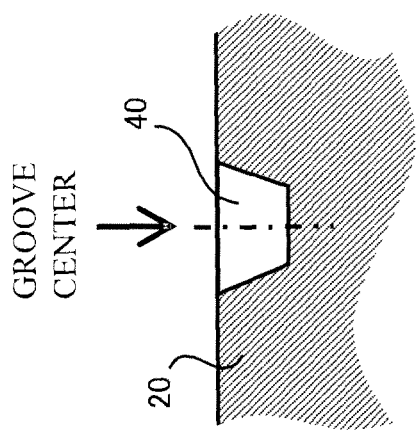
FIG. 3 is a sectional view showing another example of the shape of the groove.

It should be noted that the groove 40 may be formed to have a rectangular cross-sectional shape whose width is narrowed toward the rotor center O as shown in FIG. 3 or an arcuate cross-sectional shape as show in FIG. 4. Particularly, in terms of dispersing stress, the arcuate cross-sectional shape as shown in FIG. 4 is desirable.

The groove 40 is formed in the area described above to reduce iron loss, a harmonic component of an induced voltage and torque ripple by alleviating the saturation of magnetic fluxes interlinking between a distributed winding stator arranged on an outer peripheral side of the rotor 1 and the rotor 1.

It should be noted that torque ripple means torque pulsation at the time of power application and occurs due to a difference in ease of passage of magnetic fluxes in an air gap between the rotor 1 and the distributed winding stator arranged on the outer periphery of the rotor 1. This difference in ease of passage of the magnetic fluxes is caused by a difference in the number of magnetic fluxes in the air gap.

Further, magnetic fluxes in an area on the outer peripheral portion of the rotor core 20 defined between two straight lines connecting the outer peripheral side corners 32a and the rotor center O are saturated due to the influence of the permanent magnet 32 arranged in the circumferential direction. Thus, even if the groove 40 is provided in this area, the magnetic fluxes interlinking between the distributed winding stator and the rotor 1 do not change. Thus, it is not possible to reduce the iron loss and the like.

Next, the position of the groove 40 is described in detail with reference to FIGS. 5A and 5B. "The position of the groove 40" means the position of the groove center of the groove 40 in the following description.

Figure 5A:
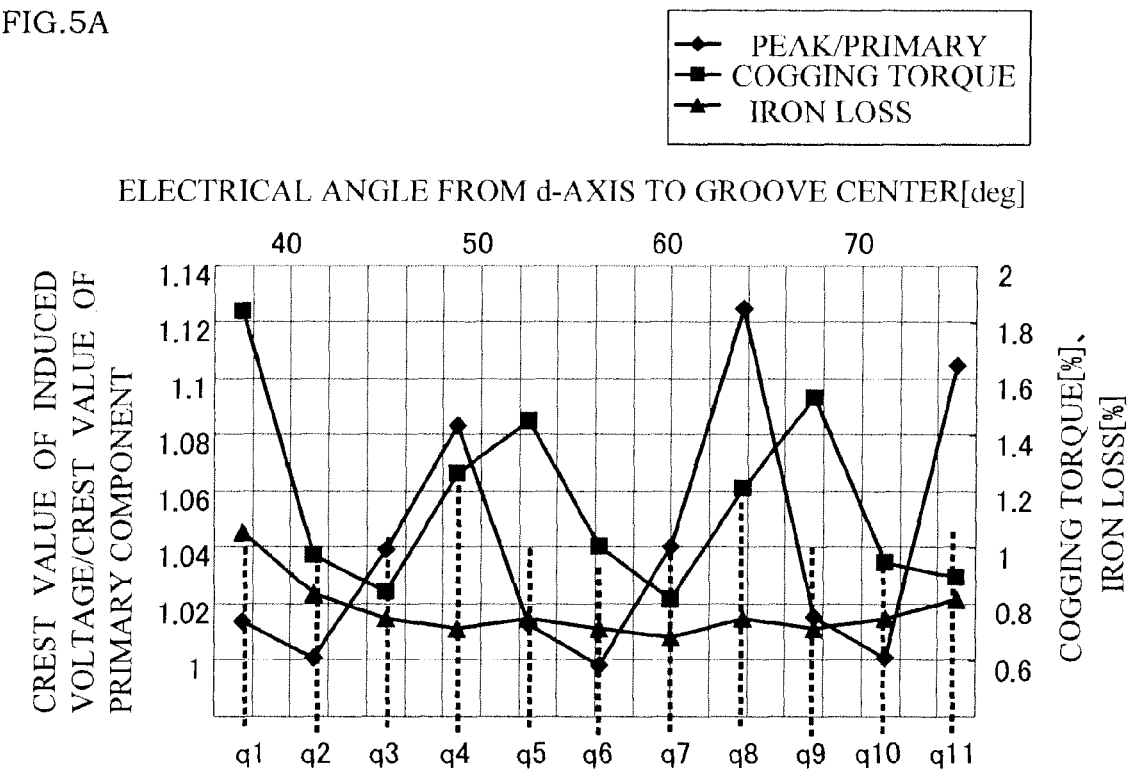
FIG. 5A is a graph showing a relationship of the position of the groove, iron loss, a harmonic ratio of an induced voltage and a cogging torque which affects torque ripple.

FIG. 5A is a graph showing a relationship of the position of the groove 40, the iron loss, the harmonic ratio of the induced voltage and a cogging torque which affects torque ripple. FIG. 5B is a view showing the vicinity of the outer peripheral portion of the rotor core 20, which originally has an arcuate shape, as a straight line and the waveform of a harmonic component of a main component of the torque ripple, superimposed on this straight line.

A left vertical axis of FIG. 5A represents the harmonic ratio of the induced voltage. This is obtained by dividing a crest value of an induced voltage waveform by a crest value of a primary component of an induced voltage waveform which means a harmonic component content in the induced voltage. It means that the smaller this value, the smaller the harmonic component.

A right vertical axis of FIG. 5A represents ratios of the cogging torque and the iron loss with respect to a case where no groove is present.

Figure 5B:
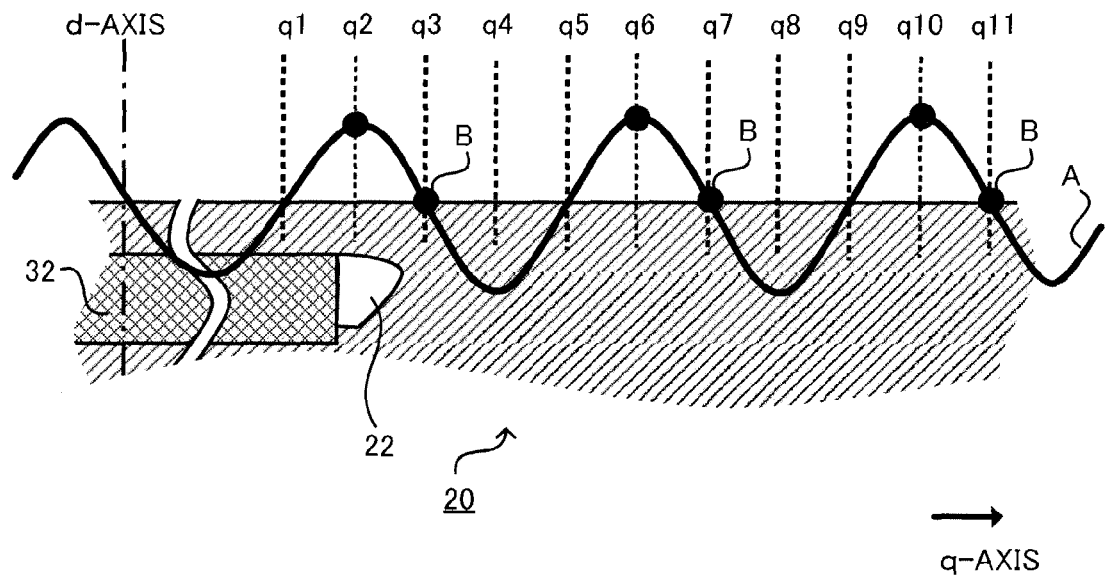
FIG. 5B is a view showing the vicinity of an outer peripheral portion of a rotor core as a straight line and the waveform of the harmonic component of the induced voltage, which is a main component of torque ripple, superimposed on this straight line.

FIG. 5B is a view showing the vicinity of the permanent magnet 32 of the rotor core 20 and solid line A shows the waveform of the main component of the torque ripple.

A horizontal axis represents an electrical angle from a d-axis as a starting point in both FIGS. 5A and 5B. Further, q1 to q11 of FIGS. 5A and 5B respectively indicate the same electrical angles.

As shown in FIGS. 5A and 5B, the iron loss is reduced as compared with the case where no groove is present regardless of at which electrical angle from the outer peripheral side corner 32a of the permanent magnet 32 toward the q-axis the groove center of the groove 40 is provided.

The cogging torque takes a minimum value substantially equal to that in the case where no groove is present at every point B from the outer peripheral side corner 32a of the permanent magnet 32 to the q-axis when points B are points dividing the outer peripheral portion of the rotor core 20 at every electrical angle corresponding to one cycle of the torque ripple main component from the d-axis as a base point.

The harmonic ratio of the induced voltage takes a minimum value at an electrical angle shifted toward the d-axis by an electrical angle corresponding to ¼ cycle of the torque ripple main component from the electrical angle at which the cogging torque takes the minimum value.

An effect brought about by providing the above groove 40 is thought to be obtained since harmonic components of the magnetic fluxes interlinking between the distributed winding stator and the rotor 1 are canceled out by providing the groove 40 in accordance with the cycle of the main component of the torque ripple.

Next, an electrical angle range in which the cogging torque and the harmonic ratio can be effectively reduced is described.

Figure 6:
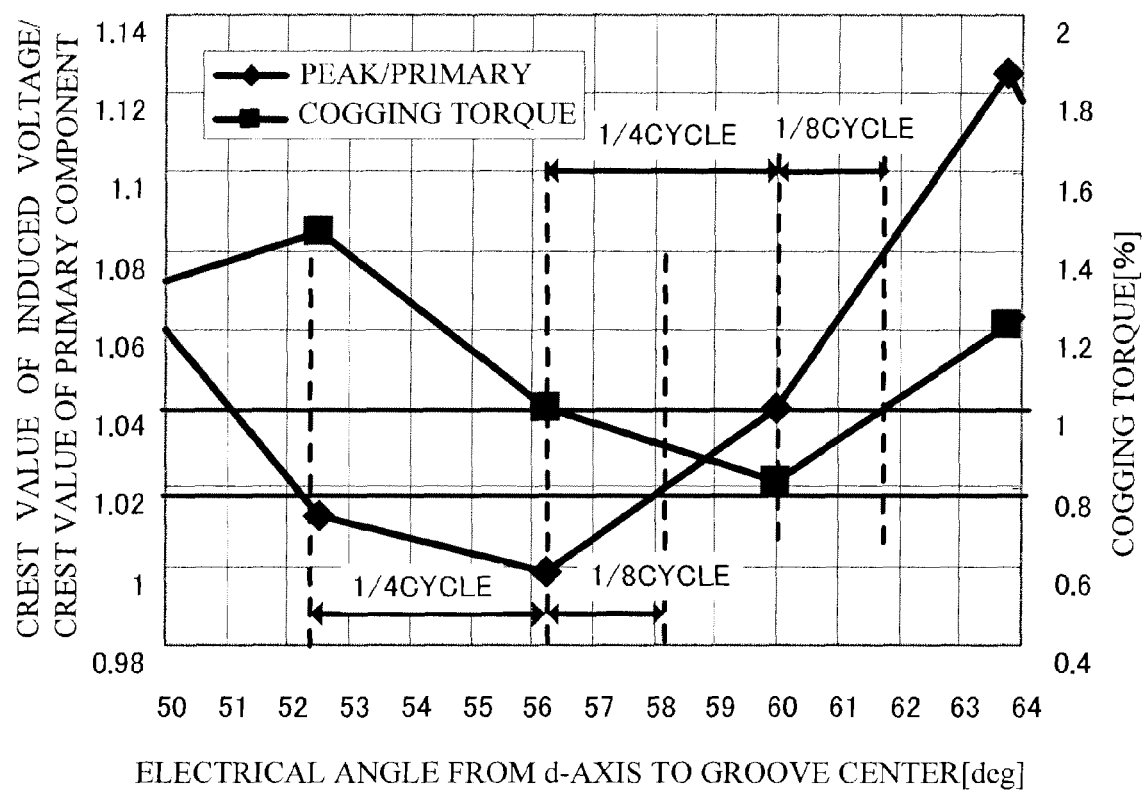
FIG. 6 is a partial enlarged graph of FIG. 5A.

FIG. 6 is a graph enlargedly showing a part of FIG. 5A.

The "electrical angle range in which the cogging torque and the harmonic ratio can be effectively reduced" is specified to be an electrical angle range in which the cogging torque is smaller than in the case where no groove is present. In this case, a range up to an electrical angle shifted by ¼ cycle of the torque ripple main component toward the d-axis and up to an electrical angle likewise shifted by ⅛ cycle toward the q-axis from the aforementioned electrical angle, where the cogging torque takes the minimum value, as a base point is an electrical angle range in which the cogging torque can be effectively reduced. It should be noted that the iron loss can also be reduced in this electrical angle range as described above.

On the other hand, similar to the electrical angle range in which the cogging torque can be effectively reduced, a range up to an electrical angle shifted by ¼ cycle of the torque ripple main component toward the d-axis and up to an electrical angle likewise shifted by ⅛ cycle toward the q-axis from an electrical angle where the harmonic ratio takes the minimum value as a base point is seen in FIG. 6. In this range, the harmonic ratio is smaller than about 1.02 and can be said to be sufficiently reduced. Accordingly, this range is defined as an "electrical angle range in which the harmonic ratio can be effectively reduced". It should be noted that the iron loss can also be reduced in this electrical angle range.

Figure 7:
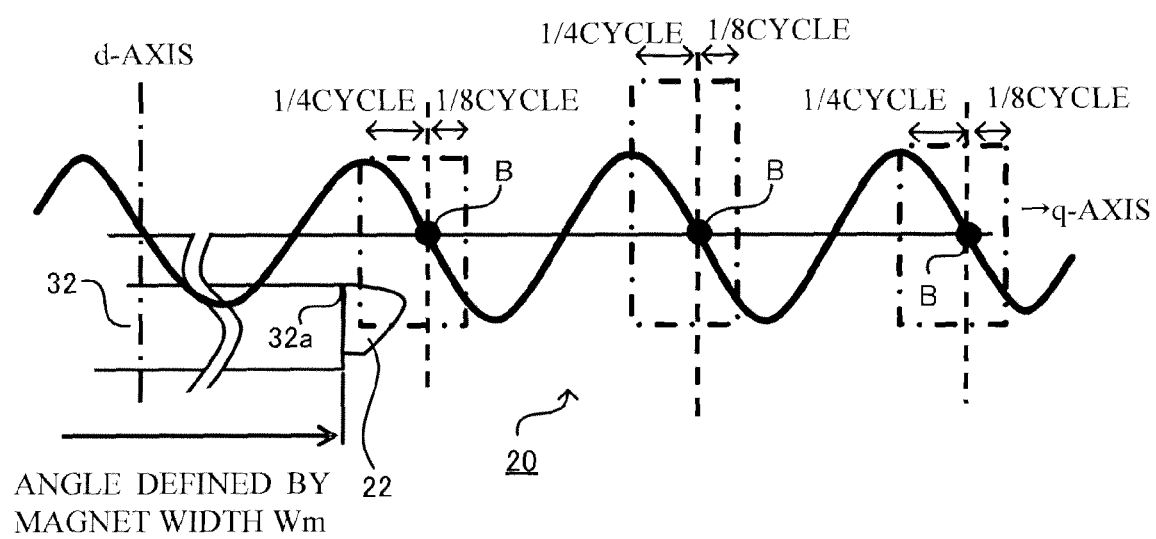
FIG. 7 is a view showing positions of the groove when it is a main purpose to reduce the iron loss and the cogging torque.

Accordingly, when it is a main purpose to reduce the iron loss and the cogging torque, the groove 40 may be provided at any position in a range up to an electrical angle shifted by ¼ cycle of the torque ripple main component toward the d-axis and up to an electrical angle likewise shifted by ⅛ cycle toward the q-axis from the point B as the base point between the outer peripheral side corner 32a of the permanent magnet 32 and the q-axis as shown in FIG. 7. It should be noted that although there are three points B in FIG. 7, it does not matter which of the points B is used as the base point. Further, all the points B may be used as the base points. The same holds for FIGS. 8 and 9 to be described below.

Figure 8:
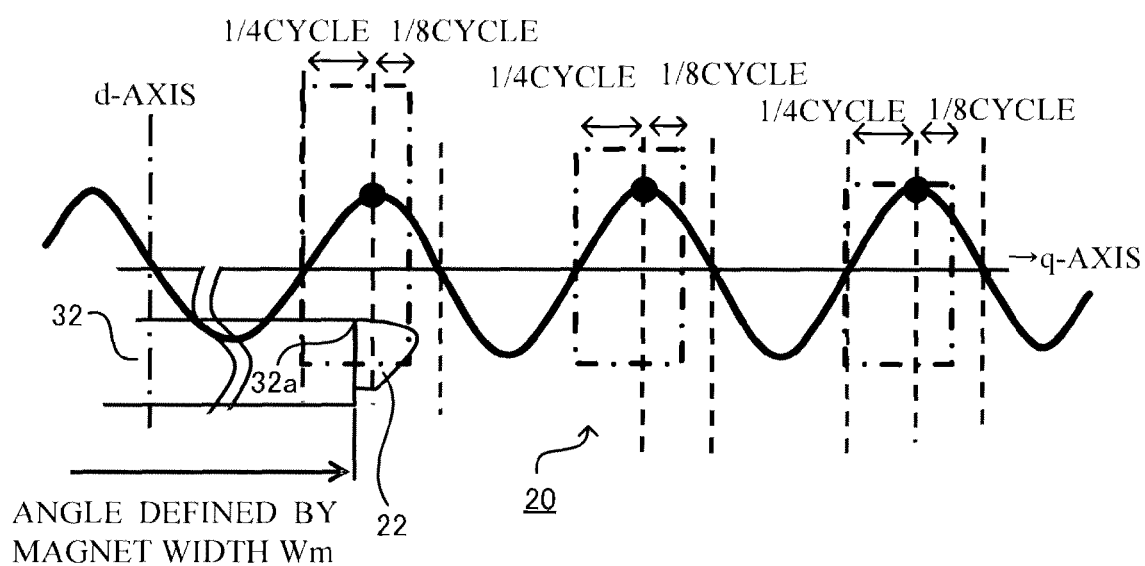
FIG. 8 is a view showing positions of the groove when it is a main purpose to reduce the iron loss and the harmonic ratio.
Figure 9:
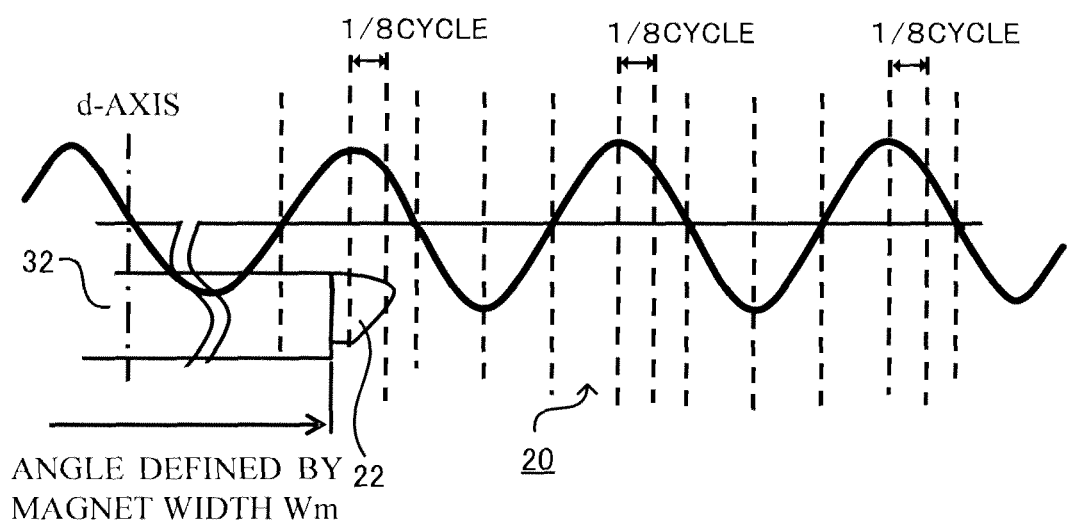
FIG. 9 is a view showing positions of the groove when it is a main purpose to reduce the iron loss, the cogging torque and the harmonic ratio.

When it is a main purpose to reduce the iron loss and the harmonic ratio, the groove 40 may be provided at any position in a range up to an electrical angle shifted by ¼ cycle of the torque ripple main component toward the d-axis and up to an electrical angle likewise shifted by ⅛ cycle toward the q-axis from a position shifted by ¼ cycle of the torque ripple main component toward the d-axis from the point B as the base point as shown in FIG. 8.

Further, in the case of this embodiment, the electrical angle ranges in the aforementioned cases where it is a main purpose to reduce the cogging torque and it is a main purpose to reduce the harmonic ratio overlap in a range up to the electrical angle shifted by ⅛ cycle of the torque ripple main component toward the q-axis from the position shifted by ¼ cycle of the torque ripple main component toward the d-axis from the point B as the base point. Thus, any of the effects of the iron loss reduction, the cogging torque reduction and the harmonic ratio reduction can be obtained in this overlapping electrical angle range.

Next, the aforementioned position of the groove 40 effective to reduce the iron loss, the cogging torque and the harmonic component is expressed by equations. If generalization by equations is possible, it can be easily used for designing.

In equations (1) to (3) described below, Wm denotes an angle formed by the both rotor outer peripheral side corners of the permanent magnet 32 and the rotor center O, m denotes an integer from a minimum integer satisfying $m \times (2\pi/n) > Wm/2$ to a quotient $n/4$, and n denotes an $n^{th}$-order component of the torque ripple.

The electrical angle range capable of effectively reducing the iron loss and the cogging torque is expressed by the following equation (1).

$$m \times (2\pi/n) + (2\pi/n)/8$$

$$m \times (2\pi/n) - (2\pi/n)/4 \quad (1)$$

The electrical angle range capable of effectively reducing the iron loss and the harmonic ratio is expressed by the following equation (2).

$$(m - \tfrac{1}{4}) \times (2\pi/n) + (2\pi/n)/8$$

$$(m - \tfrac{1}{4}) \times (2\pi/n) - (2\pi/n)/4 \quad (2)$$

The electrical angle range capable of effectively reducing the iron loss, the cogging torque and the harmonic ratio is expressed by the following equation (3).

$$(m - \tfrac{1}{4}) \times (2\pi/n) + (2\pi/n)/8$$

$$(m - \tfrac{1}{4}) \times (2\pi/n) \quad (3)$$

It should be noted that since the groove 40 for reducing the cogging torque and the groove 40 for reducing the harmonic ratio are not in an either-or relationship, one or more of each of the grooves 40 may be formed.

Torque ripple including a plurality of harmonic components such as $6^{th}$ and $12^{th}$-order components appears in electric motors generally used for electrically driven vehicles. Since components of $20^{th}$-order or lower can be easily reduced by a technique called skewing for twisting the distributed winding stator and the rotor 1 in the circumferential direction about the rotary shafts, it is a mainstream to apply skewing also in general designing. However, a main component of torque ripple of electric motors generally used for electrically driven vehicle is of $24^{th}$-order. Since a mechanical angle corresponding to one cycle of a high-order component is small for high-order components exceeding $20^{th}$-order, it is difficult to apply skewing. That is, it is difficult to reduce the main component of the torque ripple by skewing.

In that respect, the groove 40 described above can reduce also such high-order components exceeding $20^{th}$-order.

By the above, the following effects are obtained in this embodiment.

(1) In the rotor for electric motor including the rotor core 20 in which a plurality of poles each composed of a pair of permanent magnets 31 arranged in a V-shape and the permanent magnet 32 arranged in parallel to the circumferential direction in an open part of the V-shape arc arranged in the circumferential direction while alternately changing the polarities thereof, the groove 40 described below is provided on the rotor outer periphery. Out of a plurality of dividing lines connecting a plurality of points set at an electrical angle interval corresponding to one cycle of the harmonic component of the torque ripple from the d-axis to the q-axis on the outer periphery of the rotor core and the rotor shaft center, the one located between the line connecting the rotor outer peripheral side corner 32a *of the permanent magnet* 32 *and the rotor shaft center* 0 *and the q-axis is set as a base point. The groove center is located in a range between an electrical angle position shifted* ¼ cycle of the harmonic component toward the d-axis and an electrical angle position shifted by ⅛ cycle of the harmonic component toward the q-axis from the base point. That is, the groove 40 is provided in the range expressed by the equation (1) described above. In this way, the iron loss can be reduced by changing magnetic fluxes interlinking between the rotor and the stator. Further, since the cogging torque can be reduced, the torque ripple can be effectively reduced.

(2) The groove 40 is provided in a range between an electrical angle position shifted by ¼ cycle of the harmonic component toward the d-axis and an electrical angle position shifted by ⅛ cycle of the harmonic component toward the q-axis from a base point located at an electrical angle position shifted by ¼ cycle of the harmonic component toward the d-axis from the dividing line located between the rotor outer peripheral side corner 32a of the permanent magnet 32 and the rotor shaft center O and the q-axis out of the plurality of dividing lines. That is, the groove 40 is provided in the range expressed by the equation (2) described above. In this way, the iron loss can be reduced by changing magnetic fluxes interlinking between the rotor and the stator. Further, the harmonic ratio of the induced voltage, i.e. the harmonic component of the induced voltage can be reduced.

(3) The groove 40 is provided in a range from a base point located at an electrical angle position shifted by ¼ cycle of the harmonic component toward the d-axis from the dividing line located between the line connecting the rotor outer peripheral side corner 32a of the permanent magnet 32 and the q-axis out of the plurality of dividing lines up to an electrical angle position shifted by ⅛ cycle of the harmonic component toward the d-axis. That is, the groove 40 is provided in the range expressed by the equation (3) described above. Since this range overlaps the above range expressed by the equation (1) and that expressed by the equation (2), the iron loss, the harmonic component and the torque ripple can be reduced.

(Second Embodiment)

This embodiment is similar to the first embodiment in the basic configuration of the rotor 1 and differs from the first embodiment only by an electrical angle at which the groove 40 is provided.

Figure 10:
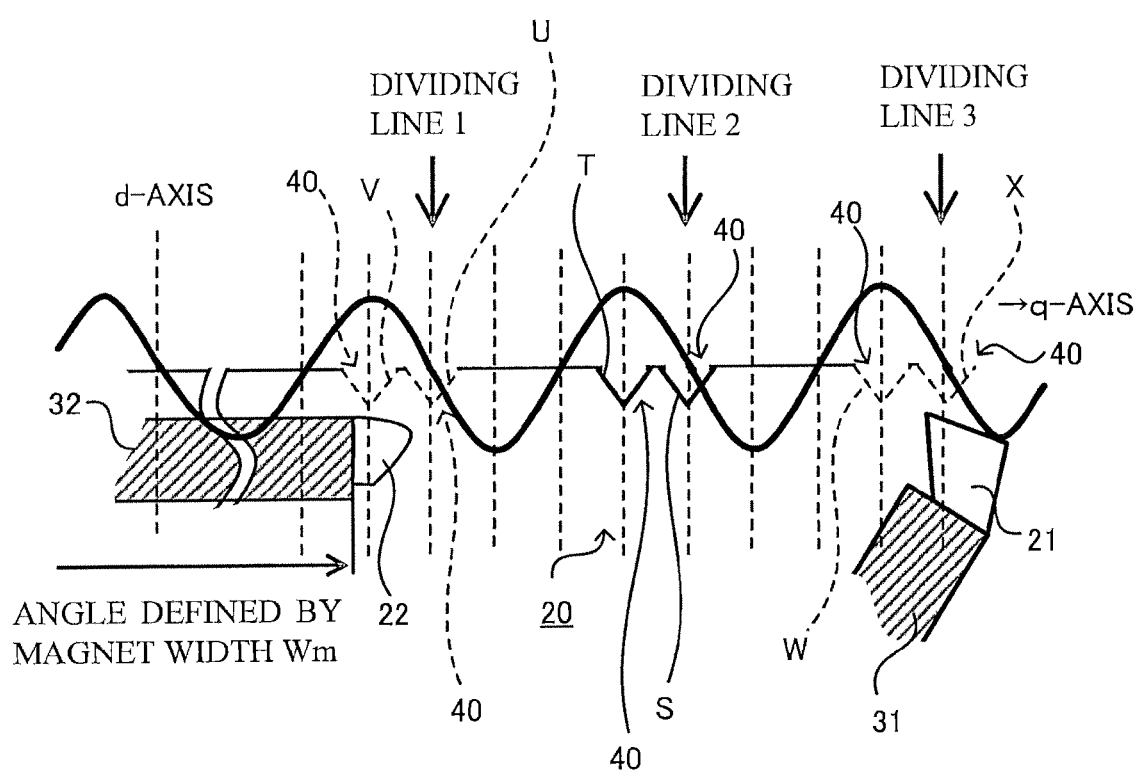
FIG. 10 is a view showing a second embodiment of the rotor for electric motor according to the present invention.

A position where the groove 40 of this embodiment is formed is described using FIG. 10.

FIG. 10 shows a part of the outer peripheral part of the rotor core 20 as a straight line and a waveform A of a main component of torque ripple superimposed on this straight line as in FIG. 7 and the like. In FIG. 10, lines dividing the outer periphery of the rotor core 20 at every electrical angle corresponding to one cycle of a torque ripple main component toward the q-axis from the d-axis as a base point are successively referred to as dividing lines 1, 2 and 3 from the d-axis side.

When it is a main purpose to reduce the cogging torque, the groove 40 is formed, for example, as shown by solid line S in the electrical angle range expressed by the equation (1) with the dividing line second closest to the q-axis from the straight line connecting the outer peripheral side corner 32a of the permanent magnet 32 arranged in the circumferential direction and the rotor center O, i.e. the dividing line 2 out of a plurality of dividing lines as the groove center. On the other hand, when it is a main purpose to reduce the harmonic component of the induced voltage, the groove 40 is formed, for example, as shown by solid line T in the electrical angle range expressed by the equation (2) with an electrical angle shifted by ¼ cycle of the torque ripple main component toward the d-axis from the dividing line 2 as the groove center.

When it is a main purpose to reduce the cogging torque and the harmonic ratio, the groove 40 is formed in the electrical angle range expressed by the equation (3) with an electrical angle shifted by ⅛ cycle of the torque ripple main component toward the q-axis from a base point located at a position shifted by ¼ cycle of the torque ripple main component toward the d-axis from the dividing line 2 as the groove center. Of course, the groove 40 may be formed at both positions indicated by solid lines S and T.

Specifically, for any purpose, the position of the groove 40 is determined based on the dividing line 2. This is equivalent to a case where m is a value obtained by adding 1 to the minimum integer satisfying m×(2π/n)>Wm/2 in terms of the equations (1), (2) and (3).

Effects in the case of providing the groove 40 in the range based on the dividing line 2 as described above are described.

The permanent magnets 31 in the V-shaped arrangement are embedded in the cavity 21 and the permanent magnet 32 arranged along the circumferential direction is embedded in the cavity 22. When the rotor 1 rotates, a centrifugal force acts on the permanent magnets 31, 32. Thus, the vicinities of the outer peripheral sides of the cavities 21, 22 of the rotor core 20 are required to have strength capable of holding the permanent magnets 31, 32 against the centrifugal force.

On the other hand, since a stress concentrates on a part where the groove 40 is provided, the strength of the rotor core 20 against the centrifugal force is reduced more at the position where the groove 40 is provided as distances between the groove 40 and the cavity 21, 22 become shorter. Examples in the case of providing the groove 40 in the electrical angle range of the equation (1) based on the dividing line 1 are shown by broken lines U, V in FIG. 10. Specifically, broken line U indicates the groove 40 centered at the position of the dividing line 1 and broken line V indicates the groove 40 centered at a position shifted by ¼ cycle of the torque ripple main component toward the d-axis from the dividing line 1. If the grooves 40 are provided at the positions of these broken lines U, V, it causes a reduction in strength against the centrifugal force in a part between the groove 40 and the cavity 22, the strength against the centrifugal force becomes insufficient depending on the position of the cavity 22 and it becomes necessary to limit the rotation speed of the electric motor to suppress the centrifugal force.

A further study is made on the groove 40 centered at the position of the dividing line 3 as indicated by broken line W and the groove 40 centered at a position shifted by ¼ cycle of the torque ripple main component toward the d-axis from the dividing line 3 as indicated by broken line X. This case may cause a reduction in strength against the centrifugal force between the groove 40 and the cavity 21 similar to the above.

Contrary to these, if the groove 40 is provided in the electrical angle range based on the dividing line 2 according to this embodiment, i.e. at the positions indicated by solid lines S, T, a reduction in strength against the centrifugal force, which affects the rotation speed of the electric motor as described above, is not caused since the groove is sufficiently distant from the both cavities 21, 22.

By the above, the following effect can be achieved in this embodiment.

(4) The groove 40 is provided with the dividing line second closest to the q-axis from the line connecting the rotor outer peripheral angle 32a of the permanent magnet 32 and the rotor shaft center O out of the plurality of dividing lines as the base point or with the electrical angle position shifted by ¼ cycle of the harmonic component of toward the d-axis from this dividing line as the base point. Since sufficient distances can be ensured between the groove 40 and the cavities 21, 22 in this way, the iron loss and the like can be reduced without causing a reduction in strength against a centrifugal force.

Although the embodiments of the present invention have been described above, the above embodiments are merely some of application examples of the present invention and not of the nature to limit the technical scope of the present invention to the specific configurations of the above embodiments.

The present application claims a priority based on Japanese Patent Application No. 2010-168050 filed with the Japan Patent Office on Jul. 27, 2010, all the contents of which are hereby incorporated by reference.

The invention claimed is:

1. A rotor for an electric motor, comprising:
   a rotor shaft;
   a rotor core in which a plurality of poles each composed of a pair of first permanent magnets arranged in a V-shape open toward an outer peripheral side and a second permanent magnet arranged in parallel to a circumferential direction in an open part of the V-shape are arranged in a circumferential direction while alternately changing polarities thereof; and
   a groove which has a groove center in a range between an electrical angle position shifted by a ¼ cycle of a harmonic component of a torque ripple toward a d-axis and an electrical angle position shifted by a ⅛ cycle of the harmonic component toward a q-axis from a base point located between a line connecting a rotor outer peripheral side corner portion of the second permanent magnet and a rotor shaft center and the q-axis out of a plurality of dividing lines connecting a plurality of dividing points set at an electrical angle interval corresponding to one cycle of the harmonic component from the d-axis to the q-axis on a rotor core outer periphery and the rotor shaft center.

2. The rotor for the electric motor according to claim 1, wherein:
   when n denotes an order of the harmonic component of the torque ripple, Wm denotes an angle formed between straight lines connecting the rotor shaft center and two rotor outer peripheral side corners of the second permanent magnet and m denotes an integer from a minimum integer satisfying m×(2π/n)>Wm/2 to a quotient n/4, a range in which the groove center is provided is expressed by the range from m×(2π/n)−(2π/n)/4 to m×(2π/n)+(2π/n)/8.

3. The rotor for the electric motor according to claim 1, wherein:
   a dividing line second closest to the q-axis from the line connecting the rotor outer peripheral side corner of the second permanent magnet and the rotor shaft center out of the plurality of dividing lines is set as the base point.

4. A rotor for an electric motor, comprising:
   a rotor shaft,
   a rotor core in which a plurality of poles each composed of a pair of first permanent magnets arranged in a V-shape open toward an outer peripheral side and a second permanent magnet arranged in parallel to a circumferential direction in an open part of the V-shape are arranged in a circumferential direction while alternately changing polarities thereof, and a groove which has a groove center in a range extending from a base point located at an electrical angle position shifted by a ¼ cycle of a harmonic component of a torque ripple toward a d-axis from a dividing line located between a line connecting a rotor outer peripheral side corner portion of the second permanent magnet and a rotor shaft center and a q-axis out of a plurality of dividing lines connecting a plurality of dividing points set at an electrical angle interval corresponding to one cycle of the harmonic component from the d-axis to the q-axis on a rotor core outer periphery and the rotor shaft center up to an electrical angle position shifted by a ⅛ cycle of the harmonic component toward the q-axis from the base point.

5. The rotor for the electric motor according to claim 4, wherein:

when n denotes an order of the harmonic component of the torque ripple, Wm denotes an angle formed between straight lines connecting the rotor shaft center and two rotor outer peripheral side corners of the second permanent magnet and m denotes an integer from a minimum integer satisfying m×(2π/n)>Wm/2 to a quotient n/4, a range in which the groove center is provided is expressed by the range from (m−¼)×(2π/n) to (m−¼)×(2π/n)+(2π/n)/8.

6. The rotor for the electric motor according to claim 4, wherein:

an electrical angle position shifted by a ¼ cycle of the harmonic component toward the d-axis from a dividing line second closest to the q-axis from the line connecting the rotor outer peripheral side corner of the second permanent magnet and the rotor shaft center out of the plurality of dividing lines is set as the base point.

* * * * *